July 10, 1962 B. L. WELLER 3,043,183
PARTICLE MEASURING INSTRUMENT AND METHOD
Filed Oct. 20, 1958 3 Sheets-Sheet 1

INVENTOR
BARTON L. WELLER
BY
Pollard Johnston Snyder & Roberts
ATTORNEYS

July 10, 1962  B. L. WELLER  3,043,183

PARTICLE MEASURING INSTRUMENT AND METHOD

Filed Oct. 20, 1958  3 Sheets-Sheet 2

INVENTOR
BARTON L. WELLER
BY
Pollard Johnston Smythe & Robertson
ATTORNEYS

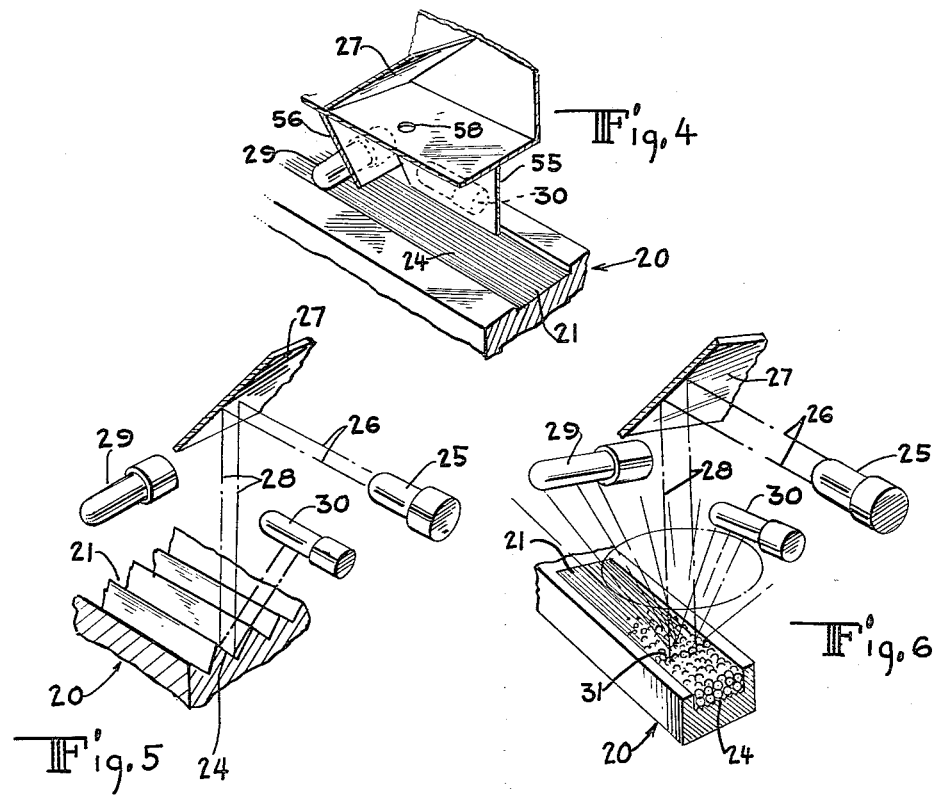
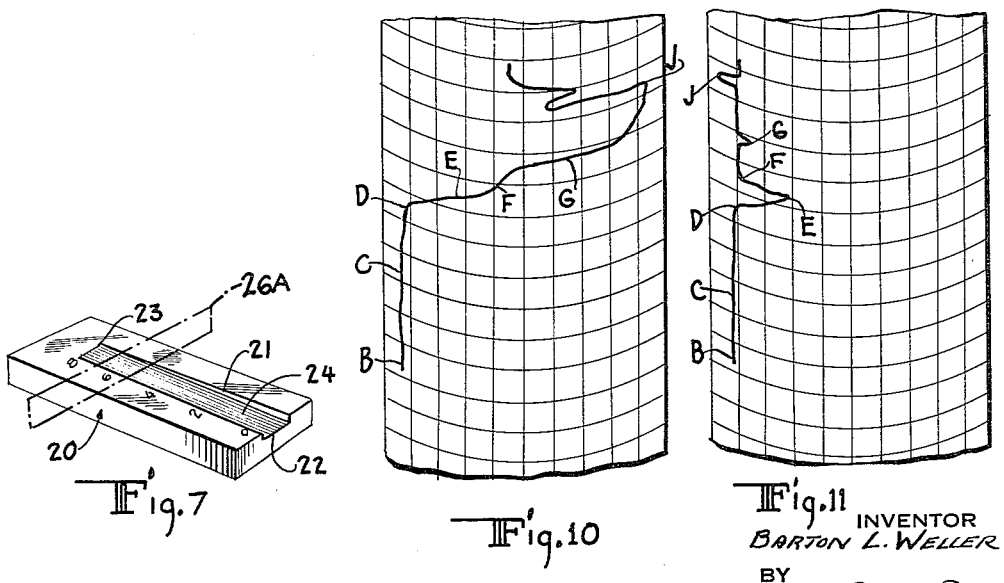

United States Patent Office 3,043,183
Patented July 10, 1962

3,043,183
PARTICLE MEASURING INSTRUMENT AND METHOD
Barton L. Weller, Easton, Conn., assignor, by mesne assignments, to Vitramon, Incorporated, Monroe, Conn., a corporation of Delaware
Filed Oct. 20, 1958, Ser. No. 768,345
19 Claims. (Cl. 88—14)

This invention relates to a method and apparatus for obtaining particle size information and particularly to one employing radiant energy such as light rays or the like.

It is desirable for many industrial operations, research work and the like, to obtain information regarding particle sizes and distribution of the particle sizes in a material. This is of particular interest, for example, in powders, ceramics, enamels, paints, inks, pigments, pharmaceuticals and other materials formed of an accumulation of separate bodies in either dry or fluid state. Various methods and apparatus have been used in the past for measuring particle size and distribution thereof, such as a plurality of sieves, microscopic examination, sedimentation, elutriation and several optical methods. None of these, however, has been completely satisfactory for various reasons. For example, one of the problems has been that boundary determinations have been difficult to ascertain precisely. Further, preparation of uniform samples has been a problem. Also, many of the previous methods have not provided a permanent record or have not been suitable for production use. Quality control requires frequent determination of the characteristics of the materials being used. It is particularly desirable in controlling such production to make particle size measurements rapidly and accurately and to record the same. Previous methods and apparatus have in many instances been slow with resultant production hold-ups and lost time.

One of the objects of the invention is to provide a method and apparatus for rapidly and accurately obtaining and indicating particle size information.

Another object of the invention is to provide a method and apparatus which will detect particles larger than a predetermined size, and the proportion of particles of a given size.

A further object of the invention is to provide an apparatus which will display and record the particle size information desired.

A still further object of the invention is to provide a method and instrument for determining particle size information in material such as cements, powders, pastes, creams, suspensions, slurries, aggregates, or other material formed of an accumulation of separate bodies in close relationship in either dry or fluid state.

Another object of the invention is to provide a method of preparing samples of a material for rapidly and accurately making particle size determination.

In one aspect of the invention, the material involved is suspended in a fluid having Newtonian properties, and the suspension is moved relative to a variable orifice or aperture so as to segregate particles of different sizes in proportion to the size or opening of the aperture as will be described hereafter. In the event the fluid does not have Newtonian properties, it is treated so that it does have such. "Newtonian liquid" is defined, for example, on page 81 of "Industrial Rheology and Rheological Structures" by Henry Green, published by John Wiley & Sons, Inc., 1949, as follows: ". . .; in the Newtonian liquid, stress is directly proportional to rate of shear; . . ." In one embodiment of the invention, the variable orifice can be formed by a gauge block or means having a slot of increasing depth, a blade or edge being moved longitudinally relative to the axis of the slot. The orifice is varied as the distance from the edge of the blade relative to the bottom of the slot changes when the blade is moved relative thereto. The sample of material suspended in the fluid is placed in the slot, and as the blade is drawn longitudinally therealong, a wedge or sample, which can be termed a "drawdown" sample, will be formed. In such a sample, when the particle size of a particle is greater than the depth of the slot, it will be scraped therefrom so as to leave the bottom of the slot exposed, all the particles of sizes equal to the slot or of smaller sizes remaining in the slot. Thereby the separation is in proportion to the opening of the orifice or depth of the slot as the blade is passed therealong producing a tapered or wedge-like sample.

Segregated particles are displayed along said slot. At a particular point, all those equal to or smaller than the depth of the slot will remain. The relative proportions of different particle sizes might be made by visual observation; however, this invention gives an improved method. The concentrations of the thus segregated particles of different sizes are measured and the relationship of the various sizes is determined from the measurements as will be explained hereafter. In one form, visible light can be used and arranged so that the impinging beam from a source will be directed in a path substantially perpendicular to the surface of material in the slot. Photocells or other radiant energy responsive elements are located to be sensitive only to diffuse light from the sample. The reflected light from the bottom of the slot will be directed essentially back on the source beam, so will not be seen by a detector placed in the hemisphere above the plane of the slot. Thereby, the amount of light received by the detector will be in proportion to the amount of material in the slot. At any particular point in the slot, the amount of material in the slot area will be dependent upon the proportion of the particles in the material smaller than the depth of the slot. Thus the detector will indicate the proportion of particles in the material the size of which is smaller than the depth of the slot at any particular point on the block.

One example of an apparatus which will record this particle size information is a conveyor means for controllably passing the block through the beam of light and an instrument for showing the light observed by the detector. The indicating instrument may record on a chart which is arranged to move at a speed in proportion to that of the conveyor. The curve so made can be correlated with the length of the block, the depth of the slot and the particle size information read therefrom. It is also possible to move the light beam relative to the sample and other types of indicating or information reading means can be employed.

In a preferred form of this embodiment, the bottom of the slot is finished so as to provide a fine finish honed parallel to the length of the slot. Such oriented honing or finish will provide minute grooves in the bottom which causes light reflected from the surface to be reflected in a plane through the impinging light beam but perpendicular to the length of the slot. In the plane through the impinging beam but parallel to the slot, the light is reflected back on the beam only. Thereby, the difference between light detected in the plane oriented perpendicular to the slot and that parallel to the slot is caused by light reflected from the bottom exclusively. In contrast, the diffused light from the material will be detected equally in these two locations. The indicating instrument is arranged to record only the difference in light at the two locations. The difference detected is the amount of the slot bottom that is exposed and measures the proportion of particles greater than the depth of a particular point in the slot. Therefore, in this preferred form, two detectors are placed to view the point where the beam impinges on the slot, one in the plane perpendicular to the slot, the other in the plane parallel to the slot.

Where the light strikes only the surface of the material, it will be diffused and reach both detectors or energy responsive means in substantially equal proportion. The balance in energy reaching the detectors will be changed in the case where the sample surface has exposed a zone or area of the bottom of the slot due to the particles larger than the slot depth being carried along by the drawdown blade. This will provide a change in the composite signal and the resulting curve or graph from which can be determined the desired particle size information.

In one form of apparatus, a direct reading of the composite energy received by the detectors may be compared with the position on the sample from which it is received. In another form, the signal can be fed through a differentiation circuit so as to give an indication of the rate of change in amount of material in the slot. The rate is in proportion to the particle size of the material.

In the preferred aspect, a slot longitudinally extending the length of the block having the sample therein is used, but a circular or other shaped slot and sample also could be employed, the apparatus being suitably arranged so that the energy beam and sample properly will be correlated. Also other types of variable apertures can be employed such as means for extruding the sample through an opening which has means for progressively, or otherwise, changing the size of the opening.

The apparatus herein provides an accurate and simple way to determine particle size and distribution. Also, because the detectors are balanced against each other, differences in supply voltage or light intensity will not affect operation and thus the operation will be stable.

These and other objects, advantages and features of the invention will become apparent from the following description and drawings which are merely exemplary.

In the drawings:

FIG. 4 is an enlarged fragmentary view of the photocell arrangement of FIGS. 1 and 3;

FIG. 5 is a schematic view of the light and photocell arrangement showing the effect on the light distribution of the grooves on the bare bottom surface of the slot;

FIG. 6 is a schematic view similar to FIG. 5, but showing diffusion of light by the particles in the sample;

FIG. 7 is a perspective view of one of the forms of gauge blocks or sample forming means which may be used;

FIG. 10 is a graph showing one example of a direct reading made by the instrument;

FIG. 11 is a graph showing a reading involving the differentiating circuit; and

Figure 2:
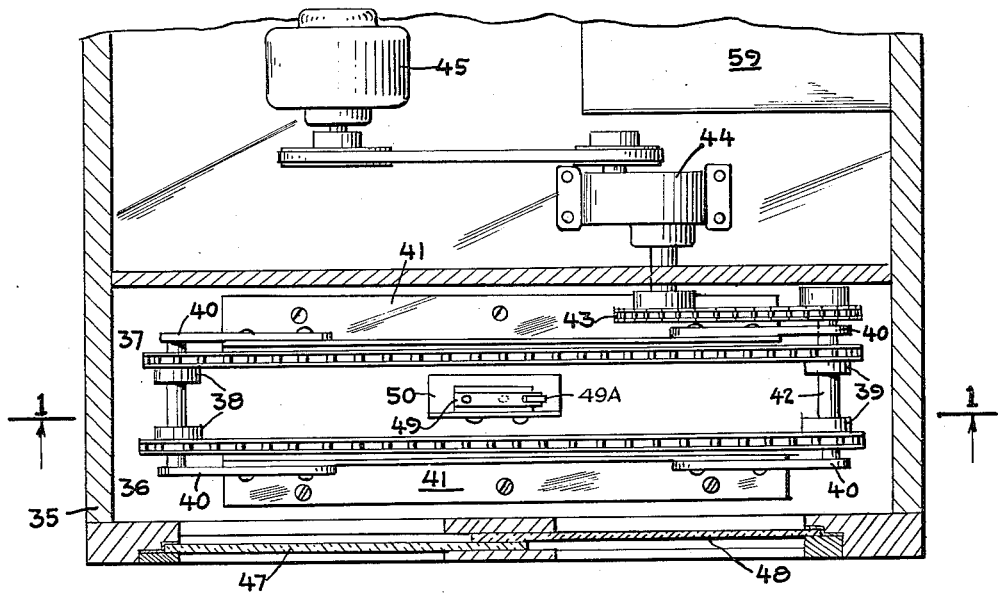
FIG. 2 is a fragmentary sectional view taken in the direction of line 2—2 of FIG. 1.

The material having particle characteristics to be determined, such as an enamel or other material having discrete particles, may be suspended in a suitable viscous vehicle or fluid, such preferably having a Newtonian viscosity. The vehicle selected is that which insures dispersion of all particles of the sample, fluid flow of the sample through the aperture and static disposition of all phases of the sample after it has been passed through the aperture and displayed on a surface. If the viscosity is high at the rates of shear encountered in the aperture, the sample will be pulled apart in the aperture and striations produced mechanically in the sample display. If, conversely, the sample is not sufficiently viscous or is particularly low in viscosity at low rates of shear, it may not remain dormant after passing through the aperture. In the latter event, areas of the steel or surface which had been exposed by particular particles might be refilled by the sample flowing after the extrusion is complete. It has been found that the sample must be essentially Newtonian in its viscosity characteristic. When viscosity is measured with such an instrument as a Brookfield viscometer, viscosities at 2, 10 and 20 revolutions per minute should preferably be within 15 percent of the viscosity at 4 revolutions per minute. The general range of viscosity might be 2,000 to 10,000 centipoise, and approximately 6,000 is preferred.

The desired viscosity characteristic is attained by appropriate vehicles in which the particles are suspended. Through trial with a particular sample, appropriate amounts of suitable suspending materials such as ethyl cellulose or methyl cellulose can induce greater flow properties and lower viscosities at low rates of shear. Such solvent additions as turpentine, pine oil, glycerine or water reduce the viscosity at high rates of shear.

The amount of liquid vehicle should be kept at a minimum necessary to induce desired flow properties. Excessive additions of liquid phases will dilute the sample and not permit sufficient density of particles to be detected in the display. Fifty percent by weight of liquid phase is a maximum and 20 to 30 percent is preferred. Stains or dyes might be added to increase light absorption and diffusion of the sample to increase the sensitivity of the detection.

As an example of one form of variable orifice, a gauge of the "drawdown" type which can be used efficaciously with the invention is illustrated in FIG. 7 wherein block 20 is made of metal or suitable material with a tapered cut or slot 21 made therein. Said cut is made with its bottom surface at a predetermined angle to the top surface of the block and extends from the open end 22 to zone 23 where it merges with the top surface of gauge or block 20. As an example, a channel five inches long can be used with its greatest depth as 0.004 inch or about 100 microns. It is to be understood, of course, that various shapes of channels or a continuous surface with an elevating blade may be used in conjunction with the apparatus and method involved herein. The channel bottom preferably is finished so as to provide longitudinally extending minute grooves, the depth of which is small in comparison to the smallest particle. The remaining surfaces of the gauge block can be randomly oriented or grained.

The material to be tested is placed at the deeper end of the channel and slightly overflowing the same, or at the other end. A doctor knife or "drawdown" blade 26A is held so that the plane of the blade is substantially perpendicular to the axis of the channel and blade edge resting on the top surface of block 20, and is drawn from the deeper end of the channel to the other end, carrying the sample therewith. Thus, the discrete particles in the viscous material are moved in a slot of decreasing depth so that particles of greater size than depth of the slot at a predetermined point will be removed from the slot, thus exposing the bottom of the slot at all points where the slot is shallower than the particles. At the point where removal first takes place, the bottom surface of the slot will appear and the extent thereof will increase until the bottom of the slot is completely exposed where the depth of the slot is less than the smallest particle in the sample. The sample is thus segregated into a tapered sample in which only particles smaller than a particular thickness of the taper are present at any particular point. In other words, the sample is segregated in a manner so that only particles not greater than a particular size are present at a particular depth or place along the slot. The viscosity of the vehicle must be such that there is no visible dragging of the material, the material coming free of the knife leaving a smooth film.

It is necessary to determine accurately the zone or area in which the material is scraped from the channel by the knife to provide the particle size information required. In order to accomplish this, a source of light or energy can be provided so that a beam thereof is directed onto the slot and material therein. Preferably it is directed substantially perpendicularly downward. An example of such can be seen in FIG. 5 wherein gauge block 20 is schematically shown with channel 21 with grooves in the slot being indicated at 24. The source of light 25 can be arranged to direct beam 26 onto mirror 27, said mirror being positioned to direct light beam or ray 28 in a direction generally perpendicular to the plane of gauge block 20. Photocell 29 is arranged to receive light in a plane parallel to the longitudinal axis of the slot, and photocell 30 is arranged at the side of the gauge to receive light diffused in that direction. In the form shown in FIG. 5, photocell 30 is substantially at right angles thereto, but it should be apparent that the photocells can be placed in various locations relative to each other, or that more than two cells could be used.

Referring to FIG. 6, particles are schematically shown at 31 receiving light and diffusing the same in all directions so that photocells 29 and 30 will receive essentially the same amount of light and have the energy received thereby substantially balanced. This is the condition in the channel before particles have been drawn out by action of the knife because of the particles being larger than the depth of the channel at that point. The grooves are shown in FIGS. 5 and 6 enlarged and out of proportion to the remainder of the device.

In the zone of the channel or slot where particles have been scraped therefrom, bare metal or the grooves in the surface of the channel will be exposed and will cause more light to be directed in a plane perpendicular to the length of the slot, so that photocell 30 will receive more light than 29 such as shown schematically in FIG. 5. The extent of the surface exposed at a point is in proportion to the percent of particles larger than the depth of the slot at the point. The difference signal from photocells 29 and 30 that results will be in the same proportion. This signal, passed through a suitable amplifier, is caused to drive a recorder pen to record the proportion of particles larger than the slot depth. The recorder chart is driven at a speed proportional to the speed at which the block is moved past the light beam 28. Thereby a graph is obtained in which the percent of particles larger than the slot depth is plotted against slot depth. Because at each point in the channel the slot depth is the same as the largest particle at that point, this graph is a plot of percent of particles larger than each indicated size.

Various forms of apparatus can be employed for carrying out this invention, one embodiment being shown in FIGS. 1 to 4, inclusive. Frame or housing 35 may contain a pair of endless chains 36, 37, said chains or conveyor means being driven by sprockets 38, 39, said sprockets being mounted on arms 40 which in turn are mounted on brackets 41, 41. In order to adjust tension in the chain and the position thereof, arms 40 may be adjustably mounted on said brackets in any suitable manner. The righthand sprockets 39 may be driven through shaft 42, chain 43 and gear box 44 by motor 45, said motor being of a constant speed or suitable type.

The frame or housing 35 may be provided with openable access doors 47, 48. The door 47 is opened and the gauge block is placed on the chain as indicated at 20 (FIG. 1), said block having projections or lugs 46, 46 for engaging the chain. The door 47 is closed and the operation is ready to be started. At the end of the operation, the block may be removed through door 48.

Figure 8:
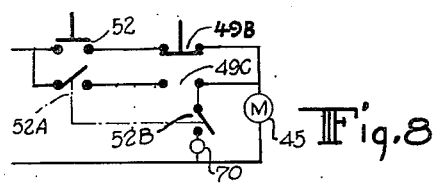
FIG. 8 is one form of circuit which can be used for operating the motor drive of FIGS. 1 to 3.
Figure 3:
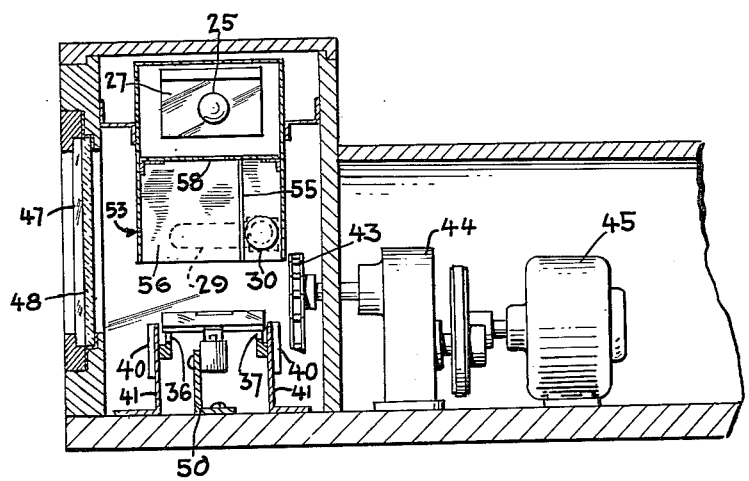
FIG. 3 is a fragmentary sectional elevation taken in the direction of line 3—3 of FIG. 1.

A limit switch 49 is adjustably mounted on bracket 50, said switch having an operator or follower 49A (FIGS. 1, 8) which extends into the path of movement of block 20.

A button 52 (FIG. 8) may be actuated so as to energize motor 45 which will cause block 20 to move to the right (FIG. 1) until the forward edge thereof strikes follower 49A and actuates switch 49B to stop the motor 45. The arrangement is then positioned so that when the second switch 52A is actuated, 49C being closed, motor 45 will again start and remain energized until follower 49A reaches the rear or trailing edge of the gauge block which then will stop the motor by opening 49C. The recorder motor 70 also will be energized when toggle switch 52B is closed and will be de-energized when switch 49C is opened. The block will pass through the beam 28 from light source 25 and will cause a signal to be generated in the circuit fed by photocells 29 and 30, and cause pen 68 to indicate the signal in recorder 69, one form of such a circuit being illustrated in FIG. 9.

Figure 1:
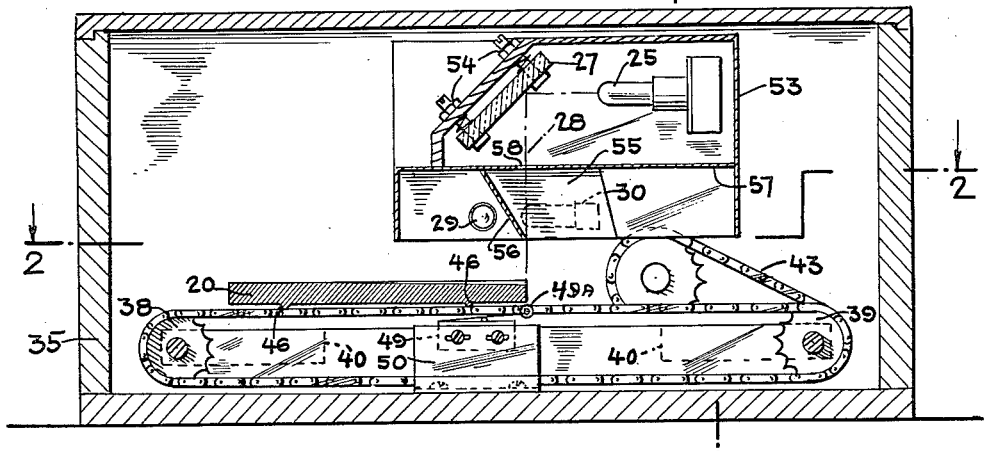
FIG. 1 is a sectional elevation taken in the direction of line 1—1 of FIG. 2 showing one form of apparatus which may be used.

The photocells 29 and 30 together with light source 25 can be mounted in removable and adjustable housing or casing 53 (FIG. 1). Mirror or reflector 27 is attached by adjustable screws 54 to casing 53. Suitable shields 55, 56 can be attached to plate 57. Plate 57 has an aperture 58 through which beam 28 passes and other apertures (not shown) adjacent the photocells through which the diffused or specular light beam passes from the surface of the sample to said photocells.

Figure 9:
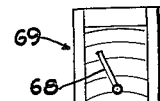
FIG. 9 is one form of a combining amplifier circuit which can be used in conjunction with the invention.
Figure 12:
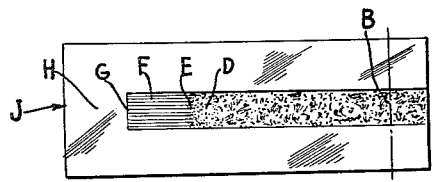
FIG. 12 is a plan view of a block with the sample therein correlated to the graphs of FIGS. 10 and 11.

The amplifier, shown generally by reference numeral 59 (FIG. 9), can be included in housing 35 if desired. Referring to FIG. 9, the circuit illustrated is one which can be used to combine the signals received by the photocells and to produce a desired combined or composite signal. Said amplifier may have the usual power supply and rectifier units 60 with a gaseous type voltage regulator tube 61 feeding energy to the circuit and to the photocells 29, 30. High impedance amplifier 62 may be employed having a cathode follower arrangement providing a combined signal at A.

When switch 63 is closed, a direct reading will be applied to the vacuum tube voltmeter combination 64, said signal being fed to grid 65 of tube 66. When switch 63 is open, the differentiation network 67 becomes effective so as to provide a differentiated combined signal.

As an example, reference may be made to FIG. 10 illustrating a chart made on a recording voltmeter having a drive ratio relation to the block of five to four, any suitable ratio being usable.

The graphs of FIGS. 10 and 11 were made of a sample of flux suspended in a viscous organic medium of approximately 5,000 centipoises. A mixture of 12 parts pine oil and 1 part ethyl cellulose was added to the sample suspension in the ratio of 1 part of said mixture to 7 parts by weight of the sample. A Newtonian liquid suspension thus was provided.

Referring now to FIGS. 10 and 11, the circuit is adjusted so that where the slot is .002 inch deep in the particular arrangement and example, when the block and recorder chart are at the point B. The line C is formed by the pen or indicator as the sample passes through the beam indicating zero percent of the particles are larger than the slot depth. In the zone where the bottom of the slot starts to appear, the balance or condition in the circuit is upset so that at D the indicator pen will start to move across the chart in proportion to the sample scraped off, indicating that the largest particle in the sample at this zone is equal to the depth at D. At F the material has been completely scraped from the bottom of the slot, showing that the smallest particle is equal to the depth at F or that 100 percent of the particles are larger than this depth. G is the point where the bottom of the slot merges with the top surface of the block. The end of the block is at J in FIG. 10. The portion of the curve at J represents light reflection at the trailing edge portions of the block. The point E will be the mean particle size of the largest proportion of particles of the sample being tested. If the distribution of the particle size is normal, E is also the mean particle size. In the curve shown, the particle size is shown along the chart, the pen deflection being in arbitrary units.

If switch 63 is left open, the differentiating circuit 67 will become effective. Correlating FIG. 10 with FIG. 11, D will be the point at which the scratches start to appear and E the mean particle size point which is where the curve DEF of FIG. 10 goes through its maximum slope. F is the point at which the total bare surface of the bottom of the slot appears. Thus, by use of the differentiating circuit, a curve can be obtained which shows the proportion of particles of each particle size.

By employing an orifice or aperture of varying size, particles are excluded at any point or setting which are bigger than the aperture or depth of slot at said point so that there is in the slot summation or integral of particles smaller than said particular setting. Then by using the differentiating circuit to differentiate the summation, a proportion is obtained.

It should be apparent that details of construction and operation may be varied without departing from the spirit of the invention except as defined in the appended claims.

What is claimed is:

1. The method of determining particle size information of material comprising the steps of moving a Newtonian fluid suspension of the material relative to a variable aperture and varying the aperture relative to the material so as to segregate particles of different sizes in proportion to the opening of said aperture in a manner so that only particles not greater than a particular size are present at a particular opening of said aperture, displaying and scanning the display of the segregated particles, measuring the concentration of the segregated particles of different sizes, and determining the relationship of various sizes of particles of said mtaerial from the measurements.

2. The method of determining particle size information of material comprising the steps of moving a Newtonian fluid suspension of the material through an aperture and changing the size of said aperture relative to the material so as to segregate particles of different sizes in proportion to the opening of said aperture in a manner so that only particles not greater than a particular size are present at a particular opening of said aperture, displaying and scanning the display of the segregated particles, and measuring the relationship of various sizes of particles of said material from the display of the segregated particles.

3. The method of determining particle size information of material comprising the steps of mixing the material with a fluid to provide a Newtonian suspension, moving said fluid suspension of the material relative to a variable aperture and varying the aperture relative to the material so as to segregate particles of different sizes in proportion to the opening of said aperture in a manner so that only particles not greater than a particular size are present at a particular opening of said aperture, displaying and scanning the display of the segregated particles, and measuring and indicating the relationship of various sizes of particles of said material in said display.

4. The method of determining particle size information of material comprising the steps of moving a Newtonian fluid suspension of the material through an aperture and varying the aperture relative to the material so as to segregate particles of different sizes in proportion to the opening of said aperture in a manner so that only particles not greater than a particular size are present at a particular opening of said aperture and to provide a summation of the particle sizes in said sample, displaying and scanning the display of the segregated particles, and measuring the concentration of the various sizes of the segregated particles in the display of the segregated particles, and determining the relationship of various sizes of particles of said material from the said measurements.

5. The method of determining particle size information of material comprising the steps of moving a Newtonian fluid suspension of the material through an aperture and varying the aperture relative to the material so as to segregate particles of different sizes in proportion to the opening of said aperture in a manner so that only particles not greater than a particular size are present at a particular opening of said aperture and to provide a summation of the particle sizes in said sample, displaying and scanning the display of the segregated particles, measuring the concentration of the various sizes of the segregated particles in the display of said segregated particles, and providing a differentiated record of the measurements.

6. The method of determining particle size information comprising the steps of suspending the particles in viscous material, forming a drawdown sample of the Newtonian fluid suspended particles in which the particles are segregated with their particle size in substantial accordance with the varying dimensions of the drawdown sample in a manner so that only particles not greater than a particular size are present at a particular dimension of the drawdown sample, passing said sample through a beam of radiant energy, and measuring the diffused energy from said sample in relation to the various zones on said sample, said diffused energy being a function of the concentration of a given particle size, so as to provide the desired particle size information.

7. The method of determining particle size information comprising the steps of suspending the particles in viscous material, forming a drawdown sample of the Newtonian suspended particles in which the particles are segregated with their particle size in substantial accordance with the varying dimensions of the drawdown sample in a manner so that only particles not greater than a particular size are present at a particular dimension of the drawdown sample, passing said sample through a beam of radiant energy, and measuring the diffused energy from said sample in relation to the length of the sample in relation to the various zones on said sample, said diffused energy being a function of the concentration of a given particle size, so as to provide the desired particle size information.

8. The method of determining particle size information comprising suspending the particles in viscous material, forming a wedge-like sample of the Newtonian fluid suspended particles in which the particles are segregated with their particle size in substantial accordance with the varying dimensions of the wedge-like sample in a manner so that only particles not greater than a particular size are present at a particular dimension of the wedge-like sample said wedge-like sample having varying dimensions with predetermined limits, passing said wedge-like sample through a light beam, collecting diffused light from said sample in at least two angularly disposed directions, said diffused light being a function of the concentration of a given particle size, and measuring the collected light in relation to the thickness of the sample so as to provide an indication of the particle size.

9. An apparatus for determining particle size information comprising a variable aperture means for providing a sample of material having segregated particles, said aperture means varying in size between predetermined limit dimensions in a predetermined manner, the location of a given particle size in said sample being related to the variation in size of said aperture means in a manner so that only particles not greater than a particular size are present at a particular opening of said aperture means, radiant energy source means for directing energy onto the sample, means for scanning the energy diffused from said sample, the level of said diffused energy being a function of the concentration of said segregated particles, and indicating means connected to said means for scanning to depict desired particle size information.

10. An apparatus for determining particle size information comprising a variable aperture means for providing a sample of material having segregated particles, said aperture means varying in size between predetermined limit dimensions in a predetermined manner, the location of a given particle size in said sample being related to the variation in size of said aperture means in a manner so that only particles not greater than a particular size are present at a particular opening of said aperture means, a radiant energy source means for directing energy onto the sample, means for collecting energy diffused from said sample, means for combining the signals diffused from the sample, the level of said signals being a function of the concentration of said segregated particles, and indicating means connected to said means for combining signals to depict desired particle size information.

11. An apparatus for determining particle size information comprisig block means for receiving a tapered sample of material, the particles of said sample being arranged with their particle size in substantial accordance with the varying dimension of the taper in a manner so that only particles not greater than a particular size are present at a particular dimension of said taper, radiant energy source means for directing energy onto said sample, means for moving said block means relative to said source so that said source passes therealong for scanning said sample, means for collecting energy diffused from said sample in at least two directions, the level of said diffused energy being a function of the distribution of said segregated particles over the surface of said block means, and indicating means responsive to said collected energy to depict the relation between the energy collected and the zone where collected so as to provide the desired particle size information.

12. An apparatus for determining particle size information comprising block means for receiving a tapered sample of material, the particles of said sample being arranged with their particle size in substantial accordance with the varying dimension of the taper in a manner so that only particles not greater than a particular size are present at a particular dimension of said taper, radiant energy source means for directing energy onto said sample, means for moving said block means relative to said source so that said source passes therealong, a pair of energy receiving means for collecting energy diffused from said sample in angularly displaced directions, the level of said diffused energy being a function of the distribution of said segregated particles over the surface of said block means, and means for combining signals from said energy receiving means to indicate the relation between the energy collected and the zone where collected so as to provide the desired particle size information.

13. An apparatus for determining particle size information comprising a variable aperture means for providing a sample of material having segregated particles, said aperture means varying in size between predetermined limit dimensions in a predetermined manner, the location of a given particle size in said sample being related to the variation in size of said aperture means in a manner so that only particles not greater than a particular size are present at a particular opening of said aperture means, radiant energy source means for directing energy onto the sample, means for scanning radiant energy directed onto said sample, the level of said scanned radiant energy being a function of the concentration of said segregated particles, means for collecting energy diffused from said sample and for producing signals in response thereto, means for combining the signals from said means for scanning including means to differentiate the combined signal, and indicating means connected to said means for combining signals to depict desired particle size information.

14. An apparatus for determining particle size information comprising block means for receiving a tapered sample of material, the particles of said sample being arranged with their particle size in substantial accordance with the varying dimension of the taper in a manner so that only particles not greater than a particular size are present at a particular dimension of said taper, radiant energy source means for directing energy onto said sample, means for moving said block means relative to said source means so that said source passes therealong, means for collecting energy diffused from said sample, the level of said diffused energy being a function of the distribution of said segregated particles over the surface of said block means, and means responsive to said collected energy to indicate changes in the relation between the energy collected and the zone where collected so as to provide the desired particle size information.

15. An apparatus for determining particle size information comprising block means adapted to receive a tapered sample of material, the particles of said sample being arranged with their particle size in substantial accordance with the varying dimension of the taper in a manner so that only particles not greater than a particular size are present at a particular dimension of said taper, said block means having an oriented finish surface, radiant energy source means for directing energy onto said sample and exposed portions of said oriented surface, means for moving said block means relative to said source, means for collecting energy diffused from said sample and oriented surface in at least two directions, the level of said diffused energy being a function of the distribution of said segregated particles on said surface, and means responsive to said collected energy to indicate the relation between the energy collected and the zone where collected so as to provide the desired particle size information.

16. An apparatus for determining particle size information comprising block means adapted to receive a tapered sample of material the particles of said sample being arranged with their particle size in substantial accordance with the varying dimension of the taper in a manner so that only particles not greater than a particular size are present at a particular dimension of said taper, the receiving surface of said block means having longitudinally extending grooves, radiant energy source means for directing energy onto said sample and exposed longitudinally extending grooves of said surface, means for moving said block means relative to said source, means for collecting energy diffused from said sample and surface in at least two directions, said diffused energy being a function of the concentration of segregated particles on said receiving surface, and means responsive to said collected energy to indicate the relation between the energy collected and the zone where collected so as to provide the desired particle size information.

17. An apparatus for determining particle size information comprising a variable aperture for providing a sample of material having particles segregated per size in a manner so that only particles not greater than a particular size are present at a particular opening of said aperture, a surface for receiving said sample of material at zones determined by particle size, said surface being treated so as to reflect light more in at least one direction, a radiant energy source for directing energy onto the sample and exposed portions of said surface, means for scanning said sample and surface, means responsive to differences in energy reflected from said sample and surface, said reflected energy being a function of the concentration of the segregated particles with respect to said surface, and indicating means connected to said means responsive to difference in energy to depict desired particle size information.

18. The method of determining the amount of Newtonian suspended material on a surface having an oriented finish, said surface having grooves extending in a predetermined direction, comprising the steps of subjecting said material on said surface to radiant energy, said energy normally being reflected from said surface in a predetermined path angularly displaced relative to said grooves and being diffused by said material, and determining the amount of material on said surface by measuring the relation between the diffused and the reflected energy from said material and surface.

19. An apparatus for determining the amount of material including a surface having an oriented finish with grooves extending in a predetermined direction thereon upon which the material is placed, radiant energy source means arranged to direct energy onto a sample of material on said surface means for producing signals, said oriented finish normally reflecting energy in a predetermined direction, and means for measuring the relation between diffused and reflected energy from said material and surface, whereby the relation between said diffused and reflected energy is a measure of the amount of said material on said surface.

References Cited in the file of this patent
UNITED STATES PATENTS

| | | |
|---|---|---|
| 1,648,369 | Svedberg et al. | Nov. 8, 1927 |
| 1,878,847 | Hausser et al. | Sept. 20, 1932 |
| 1,917,379 | Lowry | July 11, 1933 |
| 2,076,553 | Drinker et al. | Apr. 13, 1937 |
| 2,379,158 | Kalischer | June 26, 1945 |
| 2,638,688 | Hazelton | May 19, 1953 |
| 2,721,495 | Schaefer | Oct. 25, 1955 |
| 2,756,626 | Lansing et al. | July 31, 1956 |
| 2,806,401 | Demuth | Sept. 17, 1957 |
| 2,873,644 | Kremen et al. | Feb. 17, 1959 |

UNITED STATES PATENT OFFICE
CERTIFICATE OF CORRECTION

Patent No. 3,043,183                                            July 10, 1962

Barton L. Weller

It is hereby certified that error appears in the above numbered patent requiring correction and that the said Letters Patent should read as corrected below.

Column 8, line 6, strike out "said", second occurrence; line 37, after "Newtonian" insert -- fluid --; column 9, line 23, for "comprisig" read -- comprising --; column 10, line 41, after "material" insert a comma; column 11, lines 15 to 17, for "rial on said surface means for producing signals, said oriented finish normally reflecting energy in a predetermined direction," read -- rial on said surface, said oriented finish normally reflecting energy in a predetermined direction, means for producing signals, --.

Signed and sealed this 16th day of April 1963.

(SEAL)
Attest:

ERNEST W. SWIDER
Attesting Officer

DAVID L. LADD
Commissioner of Patents